United States Patent [19]

Bergmann et al.

[11] Patent Number: 4,960,874

[45] Date of Patent: * Oct. 2, 1990

[54] ISOTHIAZOLYLAZO DYES HAVING AMINOPHENYL AND AMINONAPHTHYL COMPONENTS

[75] Inventors: Udo Bergmann, Darmstadt; Johannes D. Dix, Neuhofen; Guenter Hansen; Ernst Schefczik, both of Ludwigshafen; Guenther Seybold, Neuhofen, all of Fed. Rep. of Germany

[73] Assignee: BASF Aktiengesellschaft, Ludwigshafen, Fed. Rep. of Germany

[*] Notice: The portion of the term of this patent subsequent to Aug. 16, 2005 has been disclaimed.

[21] Appl. No.: 214,502

[22] Filed: Jul. 1, 1988

Related U.S. Application Data

[63] Continuation of Ser. No. 460,793, Jan. 25, 1983, Pat. No. 4,764,600.

[30] Foreign Application Priority Data

Feb. 16, 1982 [DE] Fed. Rep. of Germany ....... 3205435

[51] Int. Cl.$^5$ ............ C09B 29/042; C09B 29/09; C09B 29/095; D06P 3/54
[52] U.S. Cl. ................. 534/791; 534/573; 534/774; 534/778; 534/779; 534/792; 534/794; 534/795; 534/733; 534/887
[58] Field of Search .......... 534/792, 794, 795, 791, 534/733, 774, 778, 779

[56] References Cited

U.S. PATENT DOCUMENTS

| | | | |
|---|---|---|---|
| 2,771,466 | 11/1956 | Towne et al. | 534/792 X |
| 3,997,520 | 2/1976 | Altermatt | 534/792 X |
| 4,225,490 | 9/1980 | Entschel et al. | 534/792 X |
| 4,324,899 | 4/1982 | Frishberg | 534/792 X |
| 4,330,467 | 5/1982 | Fleischer et al. | 534/792 X |
| 4,354,970 | 10/1982 | Fleischer et al. | 534/792 X |
| 4,374,768 | 2/1983 | Fleischer et al. | 534/792 X |
| 4,382,801 | 5/1983 | Loew | 534/792 X |
| 4,764,600 | 8/1988 | Bergmann et al. | 534/792 |

FOREIGN PATENT DOCUMENTS

| | | | |
|---|---|---|---|
| 1379233 | 1/1975 | United Kingdom | 534/792 |
| 2041391 | 9/1980 | United Kingdom | 534/792 |

*Primary Examiner*—Floyd D. Higel

*Attorney, Agent, or Firm*—Oblon, Spivak, McClelland, Maier & Neustadt

[57] ABSTRACT

Compounds of the general formula I

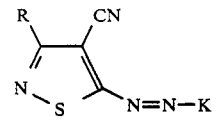

where R is alkyl or unsubstituted or substituted aryl and K is a radical of the formula

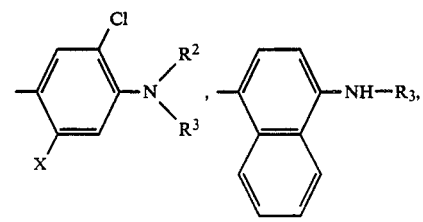

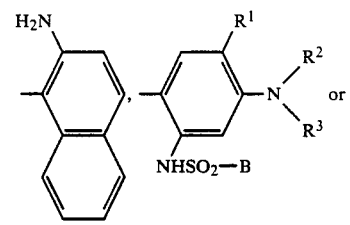

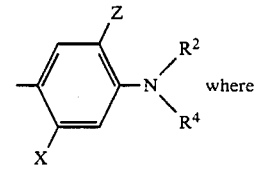

where B is $C_1$–$C_4$-alkyl or substituted amino, $R^1$ is hydrogen, methyl, methoxy or ethoxy, $R^2$ and $R^3$ independently of one another are each unsubstituted or substituted alkyl, $R^3$ may furthermore be hydrogen, $R^4$ is a radical of the formula —A—OCO—Y—R, Z is hydrogen or methyl, X is hydrogen, methyl, methoxy, chlorine or acylamino, A is $C_2$- or $C_3$-alkylene and Y is —O— or —NH—, are very useful for dyeing cellulose esters and synthetic polyesters.

5 Claims, No Drawings

ISOTHIAZOLYLAZO DYES HAVING AMINOPHENYL AND AMINONAPHTHYL COMPONENTS

This is a continuation, of application Ser. No. 06/460,793, filed Jan. 25, 1983, now U.S. Pat. No. 4,764,600.

The present invention relates to compounds of the general formula I

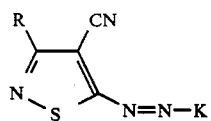   I where R is alkyl or unsubstituted or substituted aryl and K is a radical of the formula

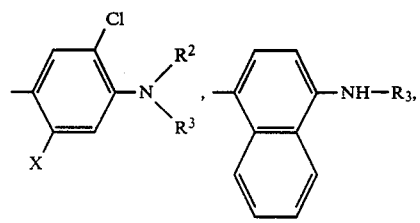

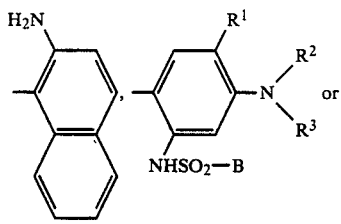

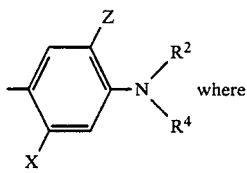 where

B is $C_1$-$C_4$-alkyl or substituted amino, $R^1$ is hydrogen, methyl, methoxy or ethoxy, $R^2$ and $R^3$ independently of one another are each unsubstituted or substituted alkyl, $R^3$ may furthermore be hydrogen, $R^4$ is a radical of the formula —A—OCO—Y—R, Z is hydrogen or methyl, X is hydrogen, methyl, methoxy, chlorine or acylamino, A is $C_2$- or $C_3$-alkylene and Y is —O— or —NH—.

Alkyl R is preferably of 1 to 8 carbon atoms, specific examples being methyl, ethyl, n-propyl, i-propyl, butyl, hexyl and 2-ethylhexyl.

Unsubstituted or substituted aryl radicals R are, for example,

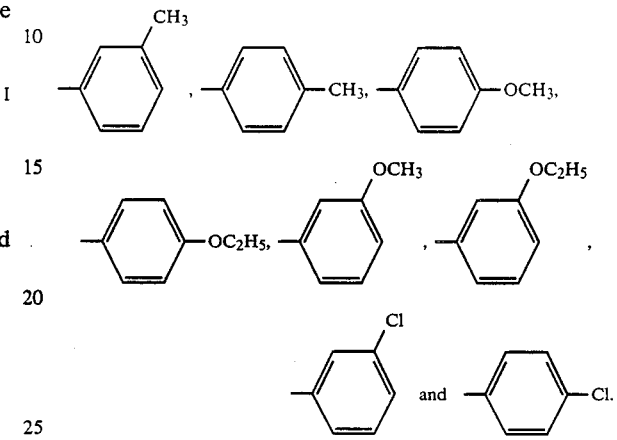

Substituted amino radicals B are, for example, $N(CH_3)_2$, $N(C_2H_5)_2$,

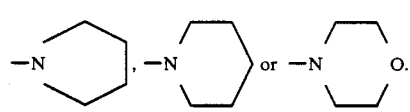

Unsubstituted or substituted alkyl radicals $R^2$ and $R^3$ are, for example, alkyl which is of 1 to 4 carbon atoms and can be substituted by chlorine, bromine, cyano, hydroxyl, $C_1$-$C_4$-alkyoxy, benzyloxy, phenoxy, phenyl, $C_1$-$C_4$-alkylcarbonyloxy which may be unsubstituted or further substituted by $C_1$-$C_4$-alkoxy, phenoxy or phenyl, phenylcarbonyloxy which is unsubstituted or substituted by Cl, Br, $OCH_3$, $OC_2H_5$, $CH_3$ or $C_2H_5$, oxycarbonyl, $C_1$-$C_4$-alkoxycarbonyl, $C_1$-$C_4$-alkoxycarbonyloxy, carbamyl, phenalkyloxycarbonyloxy, phenoxyalkyloxycarbonyloxy, $C_1$-$C_4$-alkoxyalkoxycarbonyloxy, phenylaminocarbonyloxy which is unsubstituted or substituted by Cl, methoxy or methyl, $C_1$-$C_4$-alkoxyalkoxycarbonyl, phenylalkyloxycarbonyl or $C_1$-$C_4$-alkylaminocarbonyloxy which is unsubstituted or substituted by $C_1$-$C_4$-alkyl, $C_1$-$C_4$-alkoxy, chlorine or bromine.

Specific examples of such radicals are:

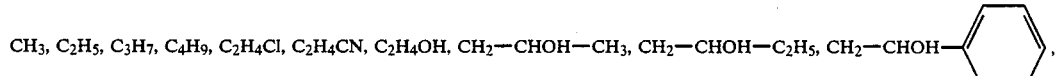

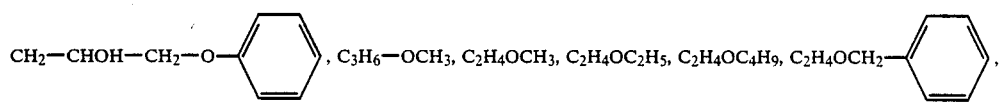

-continued
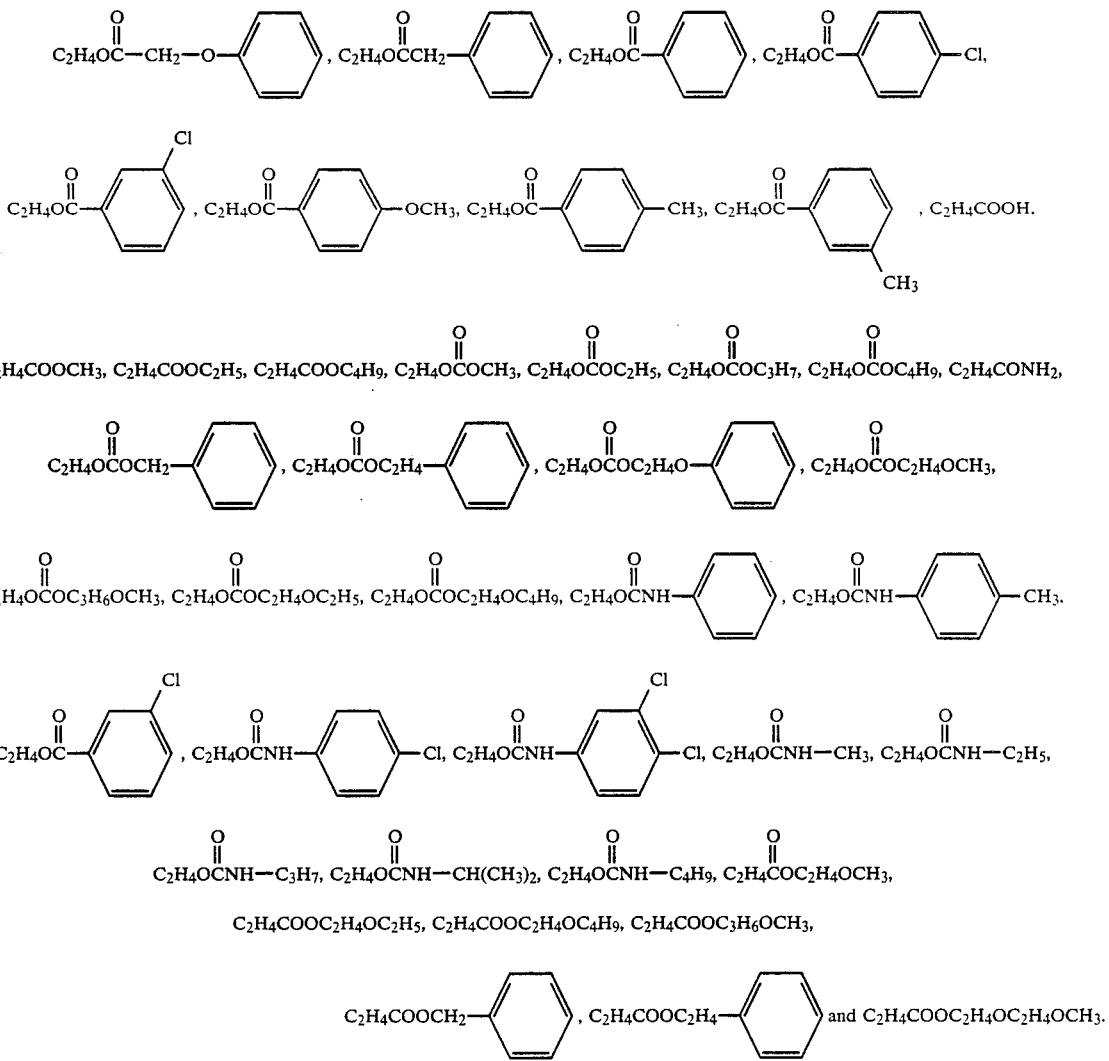
Specific examples of R⁴ are
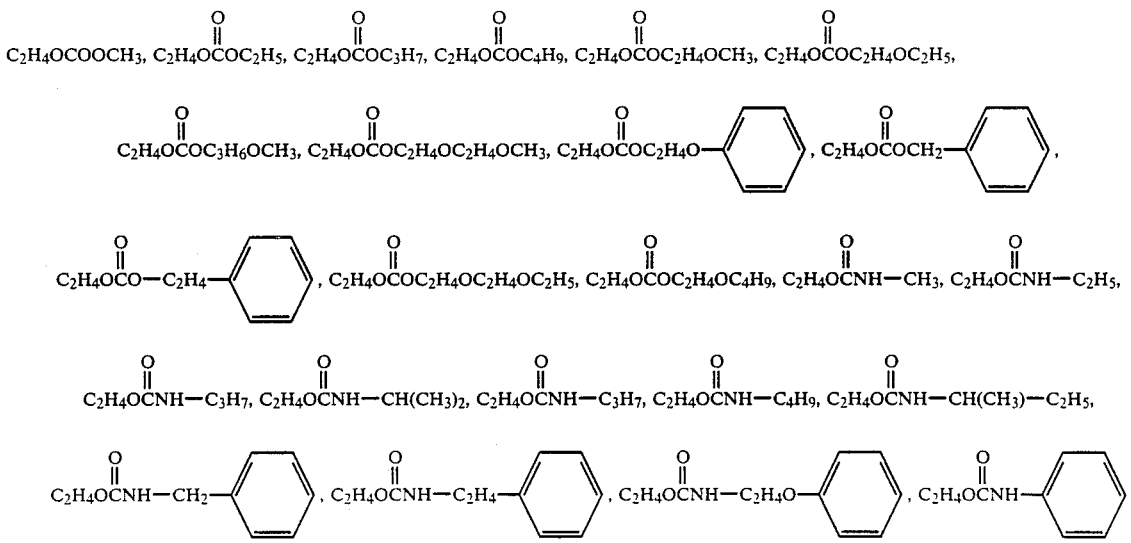

-continued

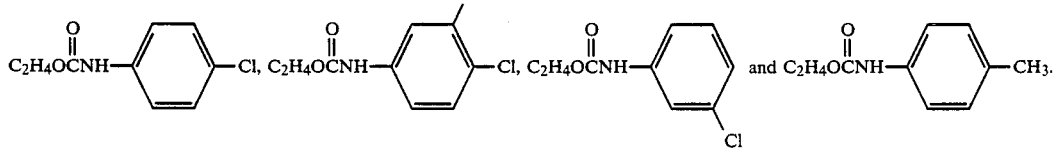

$R^2$ and $R^4$ together can form a saturated heterocyclic ring, e.g. a piperidine or morpholine ring.

Examples of acylamino radicals X are NH—CHO, $NHCOCH_3$, $NHCOC_2H_5$, NH—CO-aryl, $NHCOCH_2$-aryl,

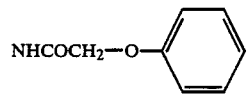

and CO—$CH_2$—O—$CH_3$.

The compounds of the formula I can be prepared by reacting a diazonium compound of an amine of the formula

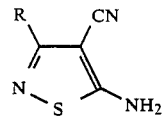

with a coupling component of the formula

H-K

In the Examples which follow, and illustrate the invention, parts and percentages are by weight, unless stated otherwise.

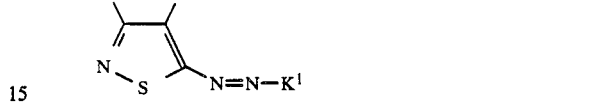

where $K^1$ is a radical of the formula

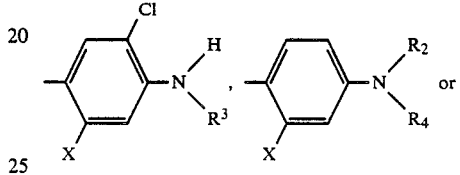

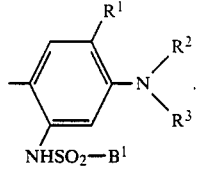

$B^1$ is $C_1$-$C_4$-alkyl, and R, $R^1$, $R^2$, $R^3$, $R^4$ and X have the above meanings.

$R^1$ is preferably H, $CH_3$ or $OCH_3$, and $R^2$ is preferably $CH_3$, $C_2H_5$, $C_3H_7$, $C_4H_9$, $C_2H_4CN$, $C_2H_4OH$, $CH_2$—$CHOHCH_3$,

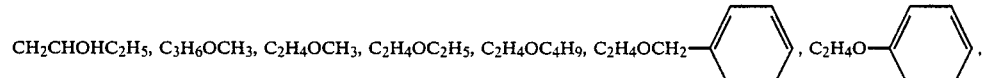

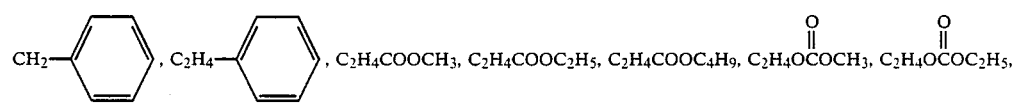

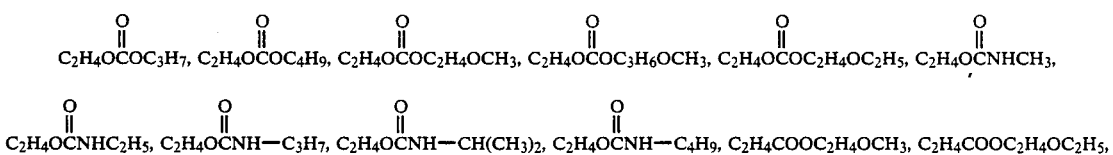

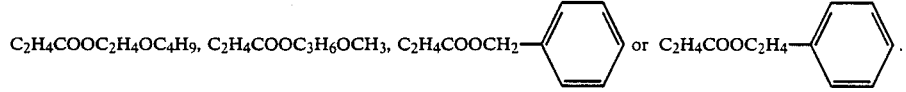

The compounds of the formula I are useful for dyeing cellulose esters and in particular synthetic polyesters; the dyeings obtained are from yellow to blue, and as a rule very fast. It may be advantageous to use a mixture of compounds of the formula I for this purpose.

Of particular industrial importance are compounds of the formula I a

EXAMPLE 1

7 parts of 5-amino-4-cyano-3-methylisothiazole were dissolved in 75 parts by volume of a mixture of 17 parts of glacial acetic acid and 3 parts of propionic acid, 20 parts of 85% strength sulfuric acid were added, 16 parts of nitrosylsulfuric acid (11.5% of $N_2O_3$) were allowed to run in slowly into the stirred mixture at 0°–5° C., and stirring was continued at this temperature for 4 hours. The diazonium salt solution thus obtained was allowed to run slowly into a mixture of 11.2 parts of N-ethyl-N-methoxycarbonyloxyethylaniline, 20 parts by volume of 32 percent strength hydrochloric acid, 250 parts of water, 250 parts of ice and one part of amidosulfonic acid. After coupling was complete, the product was filtered off under suction, washed neutral and dried under reduced pressure at 50° C. to give 16.5 parts of the dye of the formula

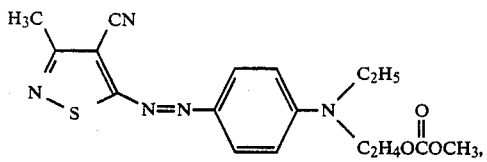

This dye dyes polyester fibers in fast, clear bluish red hues.

EXAMPLE 2

A diazo solution prepared as described in Example 1 from 7 parts of 5-amino-4-cyano-3-methylisothiazole was added to a mixture of 16 parts of N-ethyl-N,β-phenylethoxycarbonyloxyethylaniline, 30 parts by volume of 32% strength hydrochloric acid, 250 parts of water and 250 parts of ice. After coupling was complete, the product was filtered off under suction, washed neutral, and dried under reduced pressure at 50° C. to give 18.8 parts of the dye of the formula

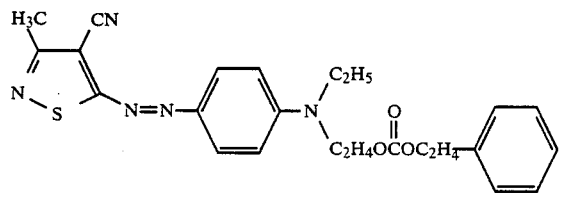

This dye dyes polyesters in bluish red hues.

EXAMPLE 3

11.1 parts of N-ethyl-N-propylaminocarbonyloxyethylaniline in 10 parts by volume of dimethylformamide and 20 parts by volume of 32% strength hydrochloric acid were added to a mixture of 250 parts of water, 250 parts of ice and one part of amidosulfonic acid. A diazonium salt solution prepared as described in Example 1 was allowed to run slowly into the above mixture. After coupling was complete, the product was filtered off under suction, washed neutral and dried under reduced pressure at 20° C. to give 17.2 parts of the dye of the formula

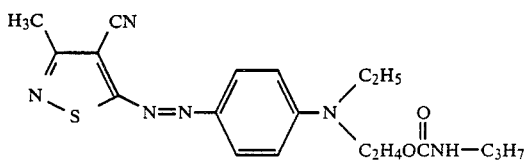

This dye dyes polyesters in clear bluish red hues.

EXAMPLE 4

14.2 parts of N-ethyl-N-phenylaminocarbonyloxyethylaniline in 8 parts by volume of dimethylformamide and 30 parts by volume of hydrochloric acid were coupled, by a procedure similar to that described in Example 3, with the diazonium salt obtained from 7 parts of 5-amino-4-cyano-3-methylisothiazole. After the product had been dried, 20.3 parts of the dye of the formula

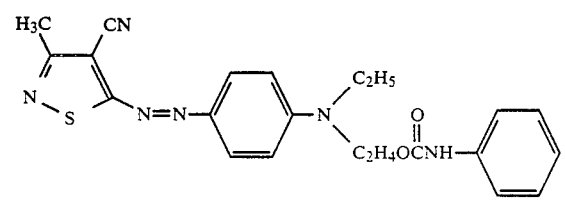

were obtained. This dye dyes polyester fibers in bluish red hues.

EXAMPLE 5

16 parts of nitrosylsulfuric acid (11.5% of $N_2O_3$) were added slowly to 10.1 parts of 5-amino-4-cyano-3-phenylisothiazole in a mixture of 75 parts by volume of glacial acetic acid/propionic acid (17:3 v/v) and 20 parts by volume of 85% strength sulfuric acid at 0°–5° C., while stirring, and stirring was continued for 4 hours at this temperature. The diazo solution thus obtained was added dropwise to a mixture of 15.7 parts of 4-chloro-3-methoxyethoxycarbonylethylaminoacetanilide, 30 parts by volume of 32% strength hydrochloric acid, 250 parts of ice, 250 parts of water and one part of amidosulfonic acid. After coupling was complete, the product was filtered off under suction, washed neutral and dried under reduced pressure at 50° C. to give 21.9 parts of the dye of the formula

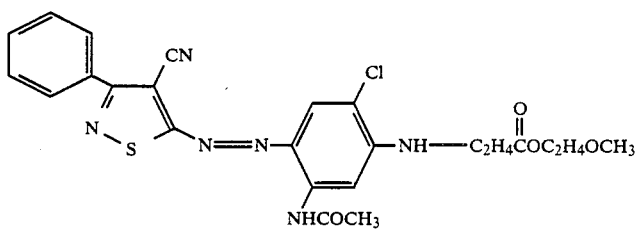

This dye dyes polyesters in fast bluish red hues.

EXAMPLE 6

A diazonium salt solution prepared as described in Example 5 from 10.1 parts of 5-amino-4-cyano-3-phenylisothiazole was added dropwise to a mixture of 16.8 parts of N-cyanoethyl-N-ethoxyethoxycarbonyloxyethylaniline, 20 parts by volume of 32% strength hydrochloric acid, 250 parts of water, 250 parts of ice and one part of amidosulfonic acid. After coupling was complete, the product was filtered off under suction, washed neutral, and dried under reduced pressure at 50° C. to give 21.3 parts of the dye of the formula

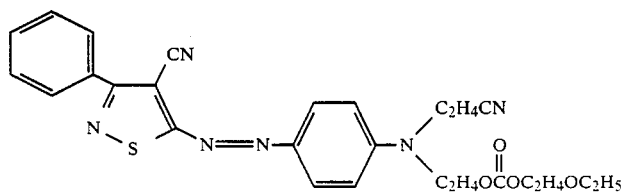

This dye dyes polyesters in fast red hues.

The compounds below were prepared by similar procedures.

| Example | R | K | Hue on polyesters |
|---|---|---|---|
| 7 | $CH_3$ | (2-Cl, 5-CH₃ phenyl with NH—$C_2H_4COOC_2H_4OCH_3$ and NHCOCH₃) | bluish red |
| 8 | " | (phenyl-N($C_2H_5$)($C_2H_4OCOC_4H_9$)) | " |
| 9 | " | (phenyl-N($C_2H_5$)($C_2H_4OCNH$—$C_4H_9(n)$)) | " |
| 10 | " | (phenyl-N($C_2H_4OCH_3$)($C_2H_4OCONH$—phenyl)) | " |
| 11 | " | (phenyl-N($C_2H_4OCNHC_3H_7$)₂) | " |
| 12 | " | (3-Cl phenyl-N($C_2H_4OCNHC_3H_7$)₂) | " |
| 13 | " | (phenyl-N($C_2H_4OCNH$—CH($CH_3$)₂)₂) | " |
| 14 | " | (3-Cl phenyl-N($C_2H_4OCNH$—CH($CH_3$)₂)₂) | " |

-continued

| Example | R | K | Hue on polyesters |
|---|---|---|---|
| 15 | " | 4-methyl-3-methyl-phenyl with N(C₂H₅)(C₂H₄OCONH-CH(CH₃)₂) | violet |
| 16 | CH₃ | 4-methyl-3-methyl-phenyl with N(C₂H₄CN)(C₂H₄OCONH-C₃H₇(n)) | red |
| 17 | " | 4-phenyl with N(CH₂C₆H₅)(C₂H₄OCOCH₃) | " |
| 18 | " | 4-phenyl with N(CH₂C₆H₅)(C₂H₄OCONH-CH(CH₃)₂) | bluish red |
| 19 | " | 4-phenyl with N(C₂H₄CN)(C₂H₄OCOC₂H₄OC₂H₅) | yellowish red |
| 20 | " | 4-phenyl with N(C₂H₄CN)(C₂H₄OCOC₂H₄OCH₃) | " |
| 21 | " | 4-phenyl with N(C₂H₄CN)(C₂H₄OCONH-C₃H₇(n)) | " |
| 22 | C₆H₅ | 4-phenyl with N(C₂H₄CN)(C₂H₄OCOC₂H₄OCH₃) | " |
| 23 | " | 4-phenyl with N(C₂H₄CN)(C₂H₄OCONH-C₃H₇(n)) | " |
| 24 | " | 4-phenyl with N(CH₂C₆H₅)(C₂H₄OCOCH₃) | red |

-continued
| Example | R | K | Hue on polyesters |
|---|---|---|---|
| 25 | " | 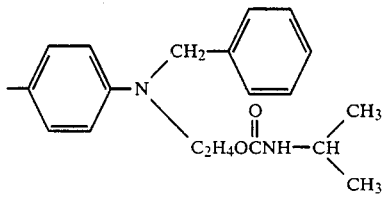 | bluish red |
| 26 | " | 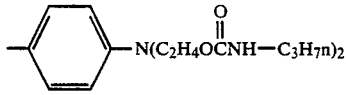 | " |
| 27 | " | 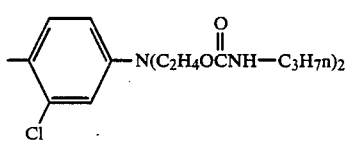 | " |
| 28 | " | 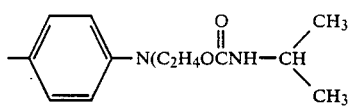 | " |
| 29 | " | 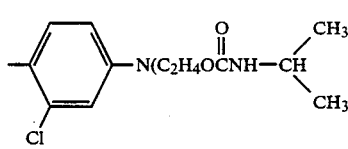 | " |
| 30 | " | 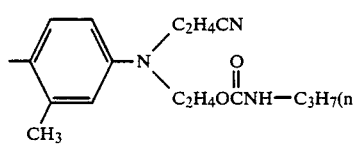 | bluish red |
| 31 | " | 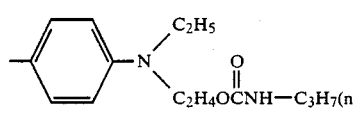 | " |
| 32 | 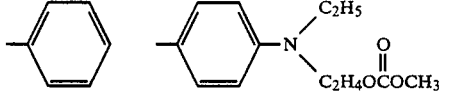 | 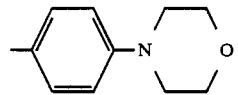 | bluish red |
| 33 | " | 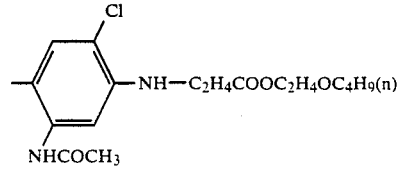 | red |
| 34 | " |  | bluish red |

-continued

| Example | R | K | Hue on polyesters |
|---|---|---|---|
| 35 | " | 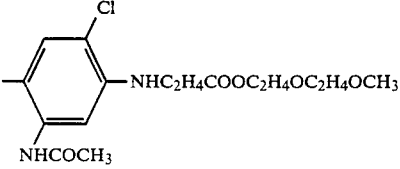 (2-Cl, 5-NHCOCH₃ phenyl)-NHC₂H₄COOC₂H₄OC₂H₄OCH₃ | " |
| 36 | " | 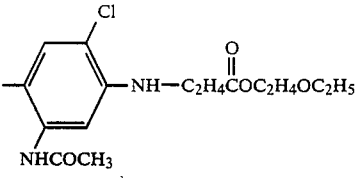 (2-Cl, 5-NHCOCH₃ phenyl)-NH—C₂H₄COC₂H₄OC₂H₅ (with C=O) | " |
| 37 | m-CH₃-C₆H₄— | 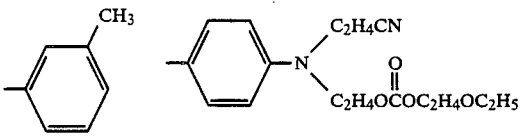 phenyl-N(C₂H₄CN)(C₂H₄OCOC₂H₄OC₂H₅) | yellowish red |
| 38 | " | 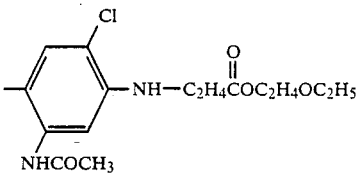 (2-Cl, 5-NHCOCH₃ phenyl)-NH—C₂H₄COC₂H₄OC₂H₅ | red |
| 39 | " | 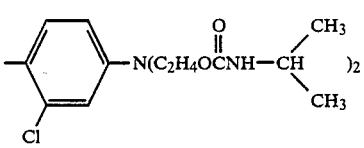 (3-Cl phenyl)-N(C₂H₄OCNH—CH(CH₃)₂)₂ | bluish red |
| 40 | m-CH₃-C₆H₄— | 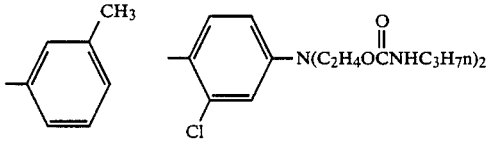 (3-Cl phenyl)-N(C₂H₄OCNHC₃H₇n)₂ | bluish red |
| 41 | " | 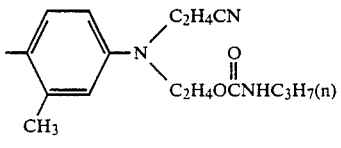 (3-CH₃ phenyl)-N(C₂H₄CN)(C₂H₄OCNHC₃H₇(n)) | red |
| 42 | " | 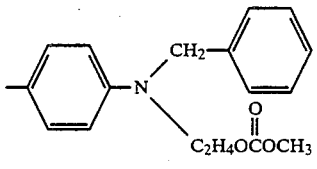 phenyl-N(CH₂C₆H₅)(C₂H₄OCOCH₃) | " |
| 43 | " |  (3-Cl phenyl)-N(C₂H₄OCOCH₃)₂ | " |
| 44 | " | 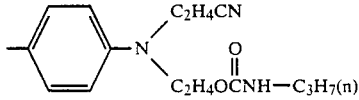 phenyl-N(C₂H₄CN)(C₂H₄OCNH—C₃H₇(n)) | yellowish red |

-continued
| Example | R | K | Hue on polyesters |
|---|---|---|---|
| 45 | " | 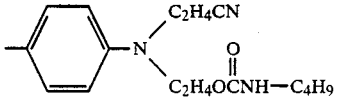 | " |
| 46 | 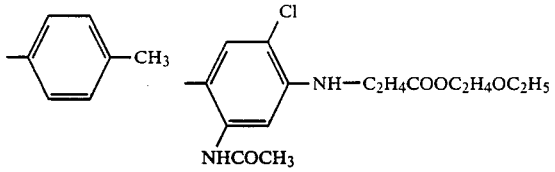 | 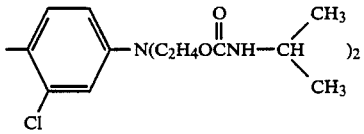 | red |
| 47 | " | 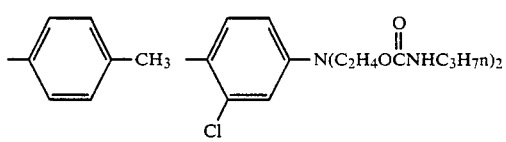 | bluish red |
| 48 | 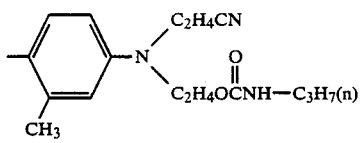 | 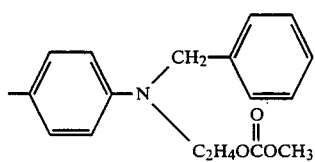 | bluish red |
| 49 | " | 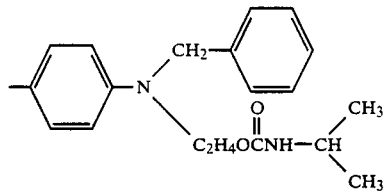 | " |
| 50 | " | 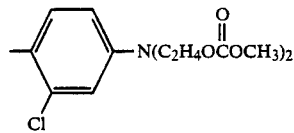 | red |
| 51 | " | 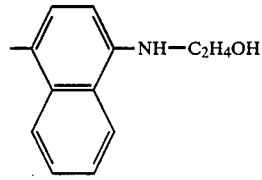 | bluish red |
| 52 | " | | red |
| 53 | CH₃ | | blue |

-continued
| Example | R | K | Hue on polyesters |
|---|---|---|---|
| 54 | " | 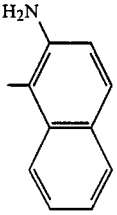 | bluish red |
| 55 | " | 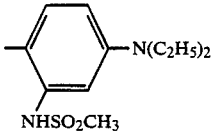 | violet |
| 56 | CH$_3$ | 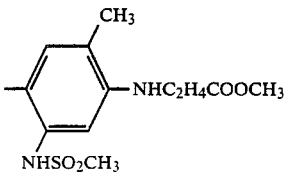 | red |
| 57 | 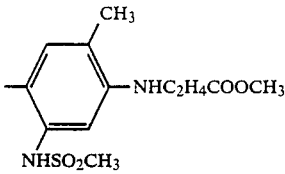 | 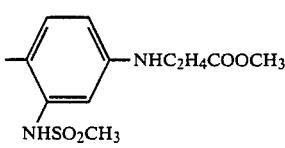 | bluish red |
| 58 | " | 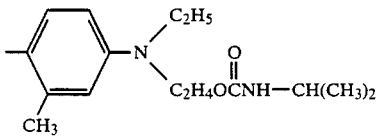 | red |
| 59 | 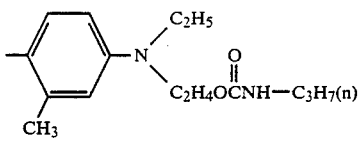 | 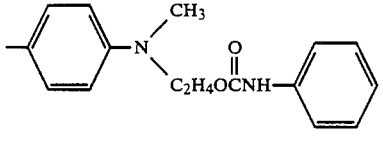 | violet |
| 60 | " | 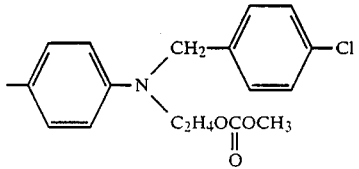 | " |
| 61 | " |  | " |
| 62 |  |  | bluish red |

-continued
| Example | R | K | Hue on polyesters |
|---|---|---|---|
| 63 | " | 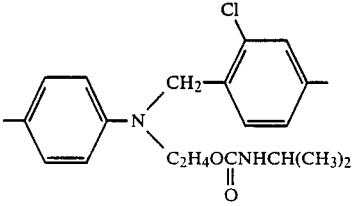 | " |
| 64 | " | 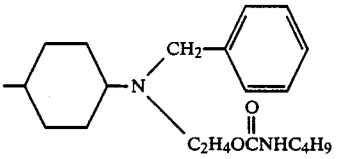 | " |
| 65 | " | 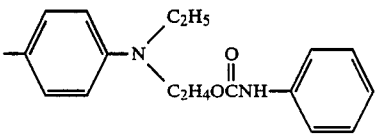 | violet |
| 66 | " | 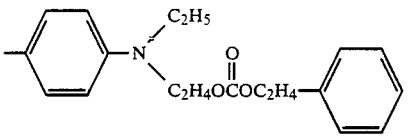 | " |
| 67 | 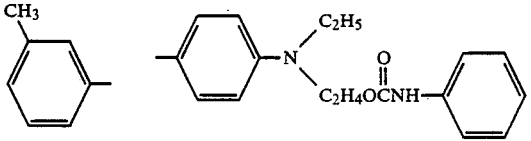 (CH₃ on m-position of benzene) | 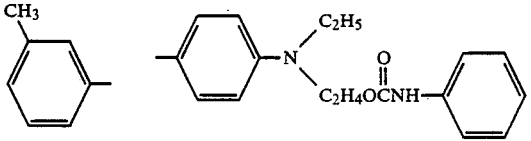 | violet |
| 68 | " | 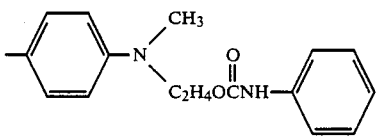 | " |
| 69 | " | 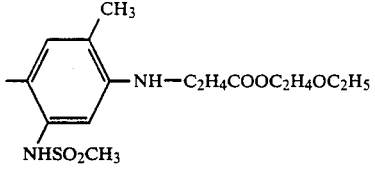 | bluish red |
| 70 | CH(CH₃)₂ | 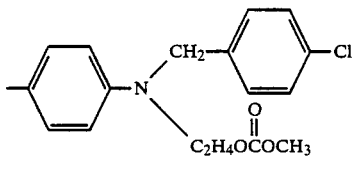 | red |
| 71 | " | 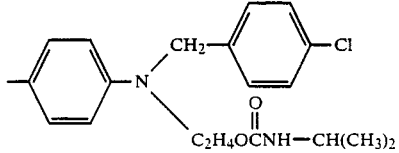 | " |

-continued

| Example | R | K | Hue on polyesters |
|---|---|---|---|
| 72 | " | 4-[N-(2-chlorobenzyl)-N-(2-(isopropylcarbamoyloxy)ethyl)amino]phenyl | " |
| 73 | CH(CH₃)₂ | 4-[N-(2-chlorobenzyl)-N-(2-acetoxyethyl)amino]phenyl | red |
| 74 | " | 4-[N-ethyl-N-(2-(3-phenylpropanoyloxy)ethyl)amino]phenyl | bluish red |
| 75 | " | 4-[N-benzyl-N-(2-acetoxyethyl)amino]phenyl | red |
| 76 | " | 4-[N-benzyl-N-(2-(butylcarbamoyloxy)ethyl)amino]phenyl | red |
| 77 | " | 4-[N-benzyl-N-(2-(butylcarbamoyloxy)ethyl)amino]phenyl | red |
| 78 | CH(CH₃)₂ | 4-[N-ethyl-N-(2-(phenylcarbamoyloxy)ethyl)amino]phenyl | bluish red |
| 79 | " | 4-[N-methyl-N-(2-(phenylcarbamoyloxy)ethyl)amino]phenyl | " |
| 80 | " | 4-[N-benzyl-N-(2-(phenylcarbamoyloxy)ethyl)amino]phenyl | red |

-continued
| Example | R | K | Hue on polyesters |
|---|---|---|---|
| 81 | CH₃ | 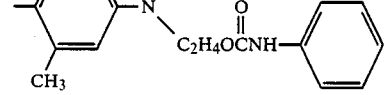 | violet |
| 82 | " | 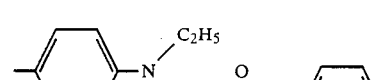 | " |
| 83 | CH₃ | 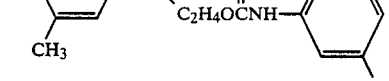 | bluish red |
| 84 | " |  | " |
| 85 | " | 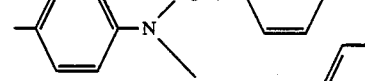 | " |
We claim:
1. An isothiazolylazo dye of the formula:
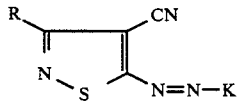
wherein R is alkyl or unsubstituted aryl radical or a substituted aryl radical of the formula:
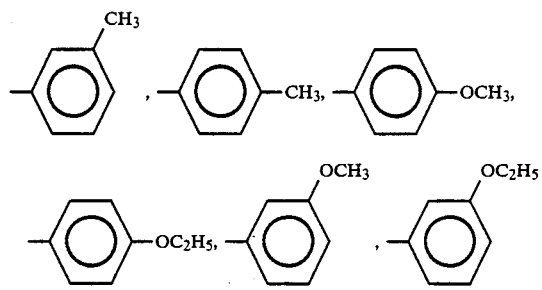
and K is a radical of the formula:
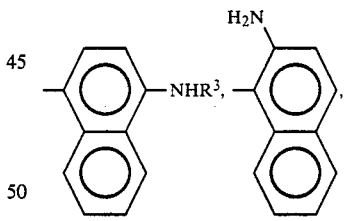
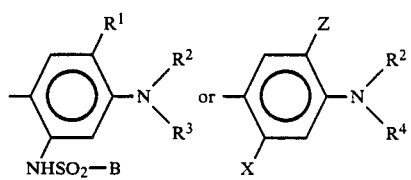
wherein B is C₁–C₄ alkyl or a substituted amino radical selected from the group consisting of:
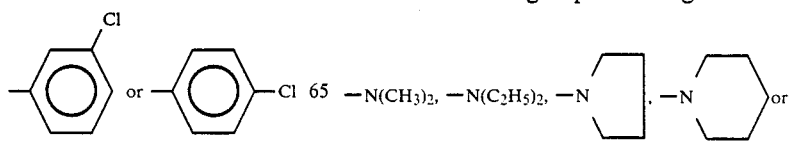

-continued

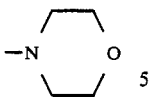

where $R^1$ is hydrogen, methyl, methoxy or ethoxy, $R^2$ and $R^3$ independently of one another are each unsubstituted $C_1$–$C_4$ alkyl or substituted alkyl groups selected from the group consisting of $C_1$–$C_4$ alkyls which are substituted by chlorine, bromine, cyano, hydroxyl, $C_1$–$C_4$ alkoxy, benzyloxy, phenoxy, phenyl, $C_1$–$C_4$-alkylcarbonyloxy which is unsubstituted or further substituted by $C_1$–$C_4$ alkoxy, phenoxy or phenyl, or phenylcarbonyloxy which is unsubstituted or substituted by chlorine, bromine, methoxy, ethoxy, methyl or ethyl, oxycarbonyl, $C_1$–$C_4$ alkoxycarbonyl, $C_1$–$C_4$ alkoxycarbonyloxy, carbamyl, phenylalkoxycarbonyloxy, phenoxyalkyloxycarbonyloxy, $C_1$–$C_4$ alkoxyalkoxycarbonyloxy, phenylaminocarbonyloxy which is unsubstituted or substituted by chlorine, methoxy or methyl, $C_1$–$C_4$ alkoxyalkoxycarbonyl, phenylalkyloxycarbonyl or $C_1$–$C_4$ alkylaminocarbonyloxy which is unsubstituted or substituted by $C_1$–$C_4$ alkyl, $C_1$–$C_4$ alkoxy, chlorine or bromine; or $R^3$ is hydrogen, $R^4$ is a radical of the formula —A—OCO—Y—R, Z is hydrogen or methyl, X is hydrogen, methyl or methoxy or an acylamino radical selected from the group consisting of:
—NHCHO, —NHCOCH$_3$, —NHCOC$_2$H$_5$, —NHCO-aryl,
—NHCOCH$_2$-aryl or

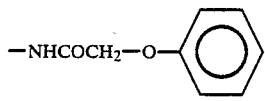

or —COCH$_2$—O—CH$_3$,
A is $C_2$- or $C_3$-alkylene and Y is —O— or —NH—.

2. The dye as claimed in claim 1, of the formula

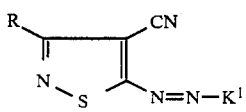

where $K^1$ is a radical of the formula

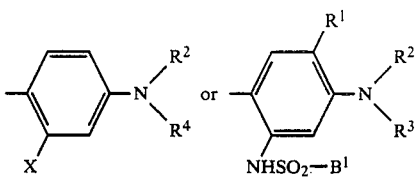

where $B^1$ is $C_1$–$C_4$ alkyl and R, $R^1$, $R^2$, $R^3$, $R^4$ and X have the above meanings.

3. The dye as claimed in claim 1, wherein R is methyl, ethyl, i-propyl, n-propyl, butyl, hexyl or 2-ethylhexyl or is phenyl which is unsubstituted or substituted by methyl, methoxy, ethoxy or chlorine.

4. The dye as claimed in claim 1, wherein $R^2$ is a straight-chain or branched $C_1$–$C_4$ alkyl and $R^3$ is hydrogen or a straight-chain or branched $C_1$–$C_4$ alkyl, or is a $C_1$–$C_4$ which is substituted by hydroxyl, $C_1$–$C_4$ alkanoyloxy, $C_1$–$C_4$ alkoxycarbonyl, $C_1$–$C_4$ alkoxycarbonyloxy, $C_1$–$C_4$ alkylaminocarbonyloxy, phenylaminocarbonyloxy, chlorophenylaminocarbonyloxy, cyano or phenyl.

5. The dye as claimed in claim 2, wherein $R^1$ is H, CH$_3$ or OCH$_3$; and $R^2$ is CH$_3$, C$_2$H$_5$, C$_3$H$_7$, C$_4$H$_9$, C$_2$H$_4$, CN, C$_2$H$_4$OH, CH$_2$CHOHCH$_3$, CH$_2$CHOHC$_2$H$_5$, C$_3$H$_6$OCH$_3$, C$_2$H$_4$OCH$_3$, C$_2$H$_4$OCH$_2$H$_5$, C$_2$H$_4$OC$_4$H$_9$, C$_2$H$_4$OCH$_2$—⌬, C$_2$H$_4$O—⌬, CH$_2$—⌬, C$_2$H$_4$—⌬, C$_2$H$_4$COOCH$_3$, CH$_2$H$_4$COOC$_2$H$_5$, C$_2$H$_4$COOC$_4$H$_9$, C$_2$H$_4$OCOCH$_3$, C$_2$H$_4$OCOC$_2$H$_5$, CH$_2$H$_4$OCOC$_3$H$_7$, C$_2$H$_4$OCOC$_4$H$_9$, C$_2$H$_4$OCOC$_4$H$_4$OCH$_3$, C$_2$H$_4$OCOC$_3$H$_6$OCH$_3$, C$_2$H$_4$OCOC$_2$H$_4$OC$_2$H$_5$, C$_2$H$_4$OCNHCH$_3$, C$_2$H$_5$OCNH$_2$H$_5$, C$_2$H$_4$OCNH—C$_3$H$_7$, C$_2$H$_4$OCNHCH(CH$_3$)$_2$, C$_2$H$_4$OCNH—C$_4$H$_9$, C$_2$H$_4$COOC$_2$H$_4$OCH$_3$, C$_2$H$_4$COOC$_2$H$_4$OC$_2$H$_5$, C$_2$H$_4$COOC$_2$H$_4$OC$_4$H$_9$, C$_2$H$_4$COOC$_3$H$_6$OCH$_3$, C$_2$H$_4$COOCH$_2$—⌬ or C$_2$H$_4$COOC$_2$H$_4$—⌬.

* * * * *